United States Patent
Vangala et al.

(10) Patent No.: US 9,775,086 B2
(45) Date of Patent: Sep. 26, 2017

(54) DEVICE AND METHOD FOR OPTIMIZED HANDOVERS

(71) Applicant: APPLE INC., Cupertino, CA (US)

(72) Inventors: Sarma Vangala, Campbell, CA (US); Tarik Tabet, San Jose, CA (US); Swaminathan Balakrishnan, San Jose, CA (US); Sreevalsan Vallath, Dublin, CA (US)

(73) Assignee: APPLE INC., Cupertino, CA (US)

( * ) Notice: Subject to any disclaimer, the term of this patent is extended or adjusted under 35 U.S.C. 154(b) by 198 days.

(21) Appl. No.: 14/320,013

(22) Filed: Jun. 30, 2014

(65) Prior Publication Data

US 2015/0003420 A1  Jan. 1, 2015

Related U.S. Application Data (60) Provisional application No. 61/840,917, filed on Jun. 28, 2013.

(51) Int. Cl.
| | |
|---|---|
| H04W 4/00 | (2009.01) |
| H04W 36/22 | (2009.01) |
| H04W 36/14 | (2009.01) |
| H04W 84/12 | (2009.01) |

(52) U.S. Cl.
CPC ............ H04W 36/22 (2013.01); H04W 36/14 (2013.01); H04W 84/12 (2013.01)

(58) Field of Classification Search
CPC ..... H04W 36/22; H04W 36/14; H04W 40/22; H04W 84/12; H04W 36/30; H04W 24/00
See application file for complete search history.

(56) References Cited

U.S. PATENT DOCUMENTS

| | | | |
|---|---|---|---|
| 8,837,317 B1* | 9/2014 | Oroskar | H04W 36/0072 370/252 |
| 9,084,166 B1* | 7/2015 | Vargantwar | H04W 36/26 |
| 2008/0096560 A1* | 4/2008 | Felske | H04W 36/0083 455/436 |
| 2010/0150102 A1* | 6/2010 | Li | H04W 36/24 370/331 |
| 2011/0320588 A1* | 12/2011 | Raleigh | H04W 36/245 709/224 |
| 2012/0163558 A1* | 6/2012 | Michaelis | H04M 1/57 379/22.01 |

(Continued)

Primary Examiner — Ricky Ngo
Assistant Examiner — Lan Huong Truong
(74) Attorney, Agent, or Firm — Fay Kaplun & Marcin, LLP (57) ABSTRACT

A device and method performs a handover. The method includes establishing a connection to a cellular network. The method includes determining whether a WiFi network is available for connection. The method includes determining performance data of the WiFi network based upon network metrics. The method includes determining a quality of service (QoS) parameter associated with a currently executed application, the QoS parameter being indicative of whether a handover from the cellular network to the WiFi network is permitted. The method includes performing the handover from the cellular network to the WiFi network when the performance data of the WiFi network satisfies a set of predetermined criteria for the network metrics and the QoS parameter indicates the handover is permitted.

20 Claims, 3 Drawing Sheets

(56) References Cited

U.S. PATENT DOCUMENTS

| | | | |
|---|---|---|---|
| 2012/0196644 A1* | 8/2012 | Scherzer | H04W 72/02 455/524 |
| 2012/0238272 A1* | 9/2012 | Hwang | H04W 36/245 455/436 |
| 2013/0077482 A1* | 3/2013 | Krishna | H04W 36/22 370/230 |
| 2013/0102313 A1* | 4/2013 | Tinnakornsrisuphap | H04W 36/22 455/436 |
| 2013/0155851 A1* | 6/2013 | Koodli | H04L 45/308 370/230 |
| 2013/0225171 A1* | 8/2013 | Singh | H04W 36/245 455/436 |
| 2013/0288673 A1* | 10/2013 | Le | H04W 48/18 455/434 |
| 2014/0226620 A1* | 8/2014 | Zhou | H04W 36/36 370/331 |
| 2014/0274049 A1* | 9/2014 | Singh | H04W 36/0083 455/436 |

* cited by examiner

DEVICE AND METHOD FOR OPTIMIZED HANDOVERS

INCORPORATION BY REFERENCE/PRIORITY CLAIM

This application claims priority to U.S. Provisional Application Ser. No. 61/840,917 entitled "Device and Method for Optimized Handovers," filed on Jun. 28, 2013, which is incorporated herein, in its entirety, by reference.

BACKGROUND

A station may be configured to establish a connection with a wireless network. The wireless network may include a cellular network and a WiFi network. Currently, no standard exists for a handover from a cellular network to a WiFi network, particularly for a handover from a WiFi network to a cellular network to offload data as no determinations are made or used as to whether a handover should be performed to switch a connection from the cellular network to a connection with the WiFi network (or vice versa). A conventional manner entails automatically performing a handover whenever a WiFi network is available. However, there may be times when a cellular network outperforms a WiFi network (e.g., advances in cellular technology, high traffic on the WiFi network, etc.). Therefore, a connection to the cellular network may be more optimal than a connection to a WiFi network. As the conventional station will always select the WiFi network over the cellular network, a suboptimal experience may exist when the WiFi network is incapable of providing the necessary capabilities over the cellular network. Furthermore, even after being connected to the WiFi network, conditions may change such that the cellular network will now provide a more optimal experience. Thus, there is a need to determine when a handover between cellular networks and WiFi networks should be performed.

DETAILED DESCRIPTION

The exemplary embodiments relate to a device and method for performing a handover. The method comprises establishing, by a station, a connection to a cellular network; determining, by a processor of the station, whether a WiFi network is available for connection; determining, by the processor, performance data of the WiFi network based upon network metrics; determining, by the processor, a quality of service (QoS) parameter associated with a currently executed application, the QoS parameter being indicative of whether a handover from the cellular network to the WiFi network is permitted; and performing, by the station, a handover from the cellular network to the WiFi network when the performance data of the WiFi network satisfies a set of predetermined criteria for the network metrics and the QoS parameter indicates the handover is permitted.

The exemplary embodiments may be further understood with reference to the following description and the related appended drawings, wherein like elements are provided with the same reference numerals. The exemplary embodiments are related to a device and method for a handover from a first wireless network type to a second wireless network type when a set of criteria has been satisfied to offload data. Specifically, the first wireless network type may be a cellular network while the second wireless network type may be a WiFi network or vice versa. When the second type of wireless network becomes available, the device and method may be configured to assess whether a handover should be performed based upon the criteria which may entail predetermined factors. The device, the wireless network types, the criteria, the predetermined factors, and a related method for data offloading will be explained in further detail below.

It should be noted that the description below relates to when a station is connected to a cellular network such that a wireless functionality may be performed such as a data transfer. The description below also relates to when the station is configured to perform a handover to a WiFi network (when available) such that the wireless functionality may be performed or continued. The cellular network may be, for example, a 3G network, a 4G network, a LTE network (depending on the naming institute), etc. The WiFi network may be, for example, a private network, a WiFi network, a HotSpot network, etc. The WiFi network may be based on, for example, IEEE 802.11a/b/g/n/ac technology, and/or any other appropriate IEEE 802.11 technology.

It should be also noted that the terms "joining," "connecting," and "associating" are used interchangeably in the description below. Specifically, these terms relate to when the station joins a wireless network. Those skilled in the art will understand that when the station joins a wireless network, an association process is performed in order for the station to connect to the wireless network. Those skilled in the art will also understand that any manner of association process may be used and the exemplary methods encompass any form of association or procedure in which the station is to connect to the wireless network.

When a user utilizes a station that is capable of connecting to various different types of wireless networks, the connection to the wireless network that provides an optimal experience should be made. For example, the station may connect to a cellular network. If a connection to a WiFi network that provides a more optimal experience is available, the station should connect to the WiFi network. The WiFi network may be configured to provide a faster rate at which data may be exchanged, a more reliable connection to the wireless network, etc. However, depending on a variety of factors that should be considered prior to this handover, the station must be configured to determine whether the WiFi network indeed provides this more optimal experience. For example, a disposition of the station may be such that there is a significant amount of interference that the cellular network remains to provide the more optimal experience despite the WiFi network ordinarily providing better connection parameters. Therefore, instead of a conventional automatic data offloading to the WiFi network from the cellular network, the station should remain on the cellular network such that the user is provided the most optimal experience given the current situation. In addition, during the course of being connected to the WiFi network, if conditions were to indicate that the cellular network provides a more optimal experience, the station should again determine whether a handover from the WiFi network to the cellular network should be performed. In this manner, a data offloading may be provided to the wireless network from which the station is handed over.

It should be noted that the WiFi network normally providing a more optimal experience is only exemplary. That is, the WiFi network does not always provide the best data exchange rate, connection reliability, etc. Those skilled in the art will understand that the cellular network may provide the better connection parameters. For example, a current situation may indicate that the cellular network is more optimal than the WiFi network. In another example, the cellular network may be enhanced such that a more optimal experience is provided normally over the WiFi network. Accordingly, the device and method may relate to determining whether the station is to perform a handover from a connection to a WiFi network to a connection to a cellular network. As will be described in further detail below, the device and method determine whether the station is to perform the handover from a first wireless network to a second wireless network so long as a more optimal experience is provided.

Figure 1:
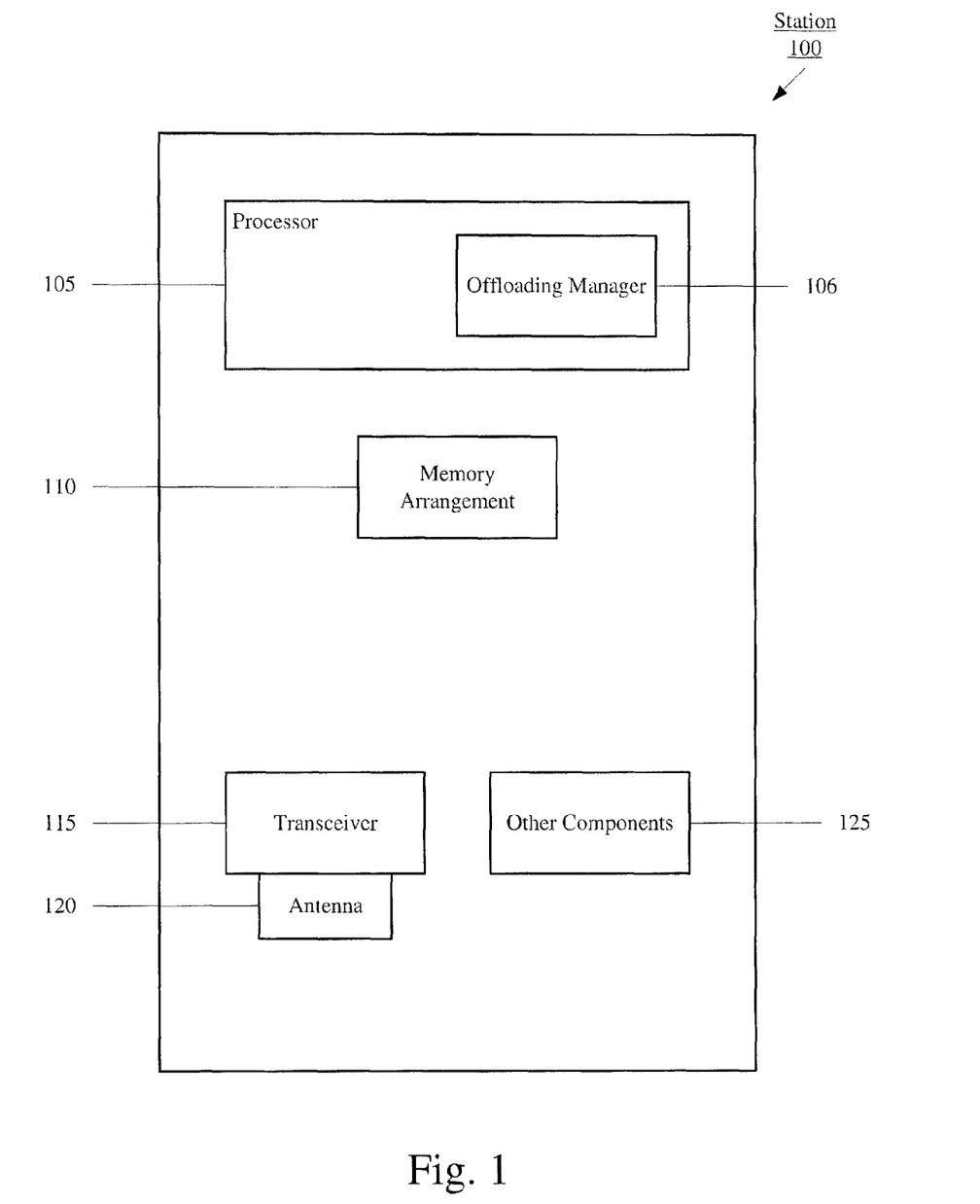
FIG. 1 shows an exemplary device for an optimized handover between a cellular network and a WiFi network.

FIG. 1 shows an exemplary station 100 for an optimized handover between a cellular network and a WiFi network. The station 100 may represent any electronic device that is configured to connect to a wireless network and provide association functionalities such as relating to a data exchange. For example, the station 100 may be a portable device such as a cellular phone, a smartphone, a tablet, a laptop, etc. In another example, the station 100 may be a stationary device such as a desktop terminal. The station 100 may include a processor 105, a memory arrangement 110, a transceiver 115, an antenna 120, and other components 125. For example, the other components 125 may include a portable power supply (e.g., battery) if the station 100 is portable, a data acquisition device, ports to electrically connect the station 100 to other electronic devices, a display device, an input/output device, etc.

The processor 105 may be configured to execute a plurality of applications of the station 100. For example, the applications may include a web browser when connected to a communication network via the transceiver 115. In another example, the processor 105 may execute an offloading manager 106 which is an application that determines whether a handover is to be performed when a WiFi network is available. The memory 110 may be a hardware component configured to store data related to operations performed by the station 100. Specifically, the memory 110 may store network parameter data (e.g., metrics) related to operations of a wireless network that is currently connected or subsequently to be connected. The memory 110 may also store hysteresis data related to a connection to a wireless network and previous connections that may further indicate whether the handover is to be performed.

The transceiver 115 may be a hardware component configured to transmit and/or receive data. The transceiver 115 may therefore enable communication with other electronic devices directly or indirectly through a network. Specifically, the transceiver 115 may be configured to transmit requests for network related data. The transceiver 115 may operate on a variety of different frequencies or channels (e.g., set of consecutive frequencies) that are related to a cellular network and a WiFi network via the antenna 120. For example, the antenna 120 may enable the transceiver 115 to operate in a low-band frequency operating range between 800-900 MHz for the cellular network while enabling the transceiver 115 to operate in a high-band frequency operating range between 1800-2100 MHz for the WiFi network.

The offloading manager 106 executed by the processor 105 may be configured to receive various network metrics and network related data including hysteresis data that is used as a basis to determine whether an available WiFi network is to be used for a handover from a cellular network. The offloading manager 106 may include a predetermined set of criteria such that the network metrics/related data provides the determination of whether or not to perform the handover. As will be described in further detail below, the criteria may include availability of the WiFi network, determining if a connection may be made to the WiFi network, determining whether the WiFi network provides a more optimal experience, determining if the hysteresis data indicates the WiFi network provides a more optimal experience, and determining any related quality of service (QoS) parameters for the handover.

Figure 2:
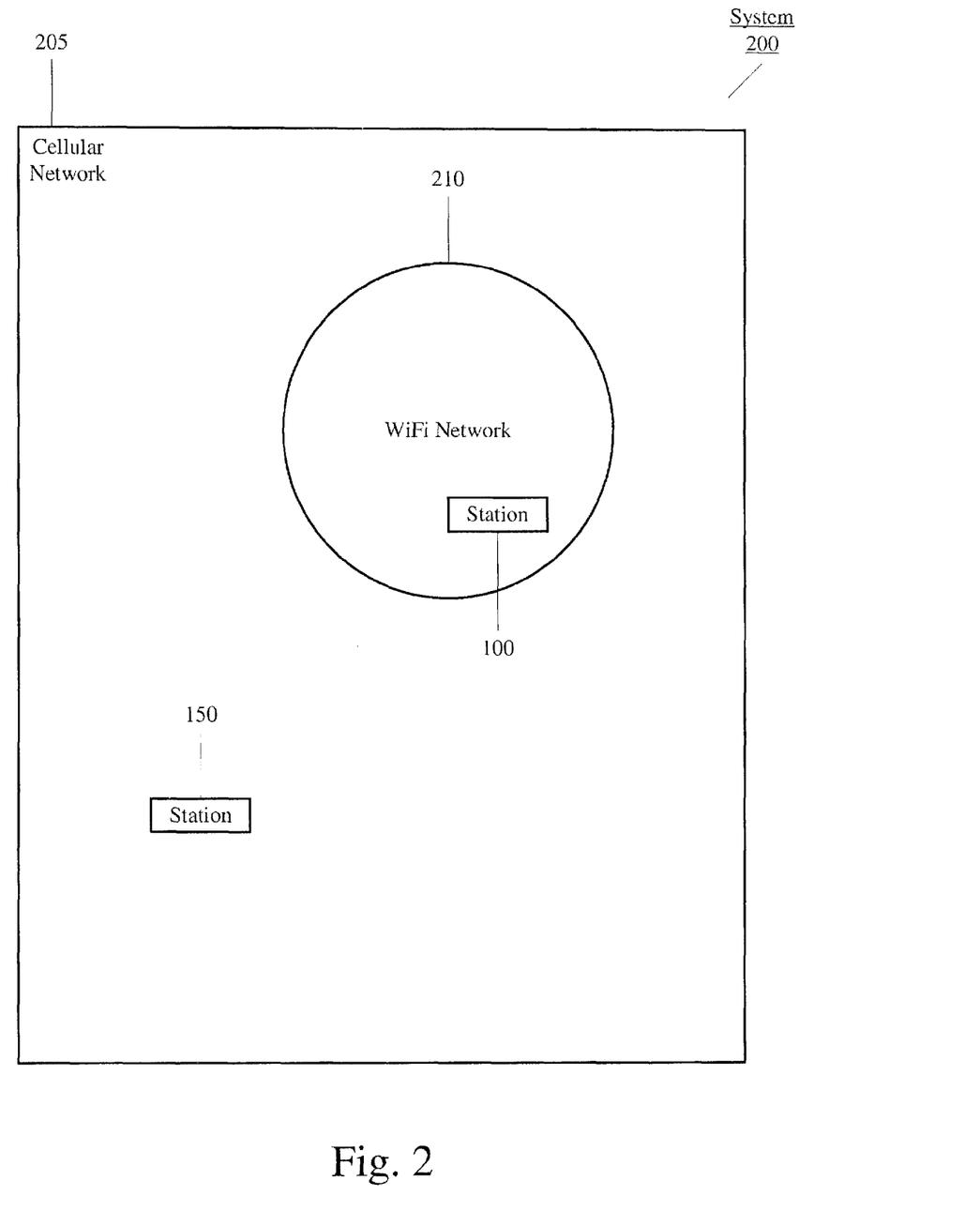
FIG. 2 shows an exemplary system for an optimized handover between a cellular network and a WiFi network.

FIG. 2 shows an exemplary system 200 for an optimized handover between a cellular network 205 and a WiFi network 210. The system 200 relates to the cellular network 205 having an operating area in which the WiFi network 210 has an operating area disposed therein. As illustrated, the WiFi network 210 may be wholly disposed within the operating area of the cellular network 205. Thus, when the station 100 is within the operating area of the WIFi network 210, the station 100 may associate with the cellular network 205 or the WiFi network 210. However, when outside the operating area of the WiFi network (such as the station 150), the station 150 may only be able to associate with the cellular network 205. That is, a WiFi network 210 is unavailable for connection. However, if the station 150 were to move into the operating area of the WiFi network 210 (when the station 150 is portable or physically moved), the station 150 may also be able to associate with the WiFi network 210 along with the cellular network 205. The determination of whether to data offload to the WiFi network 210 relates to the station 100 which is disposed within the operating area of the WiFi network 210 and also within the operating area of the cellular network 205. However, as will be described in further detail below, an initial criterion of the set of criteria is to determine whether a WiFi network connection is available.

It should be noted that the configuration of the system 200 is only exemplary, specifically regarding the cellular network 205 and the WiFi network 210. In a first example, the cellular network 205 has an operating area that is relatively large while the WiFi network 210 has an operating area that is relatively small in comparison. However, a configuration may be possible in which the WiFi network 210 has a larger operating area. In a second example, the WiFi network 210 has an operating area that is wholly disposed within the operating area of the cellular network. However, the WiFi network 210 may have a portion of its operating area that overlaps with the operating area of the cellular network 205. When the station 100 is disposed within this overlapping area, the determination of whether to data offload may be performed. In a third example, the shapes of the operating areas of the cellular network 205 and the WiFi network 210 may be any shape, contiguous, separated, etc. In a fourth example, the use of only one cellular network and one WiFi network 210 is for illustrative purposes only. The cellular network 205 may be a wide area network in which the operating area may cover a significantly large area. A further cellular network may have an overlapping portion with the cellular network 205. There may also be at least one further WiFi network disposed within or having an overlapping portion with the cellular network 205. The multiple WiFi networks may also overlap within the cellular network 205.

The exemplary methods provide a manner of optimizing a handover from a first network connection to a second network connection such that a data offloading may be performed to provide an optimal experience for a user. The station 100 may be disposed in a location such that a connection to the cellular network 205 and the WiFi network 210 is possible. The station 150 may also be moved to a location such that the connection to the cellular network 205 and the WiFi network 210 is possible. When the cellular network 205 and the WiFi network 210 are both available for a connection by the station 100, the offloading manager 106 may determine whether a handover is to be performed based upon a set of criteria such that a most optimal experience may be provided to the user of the station 100. That is, the offloading manager 106 determines whether a handover is to even be performed or when the handover is to be performed from the cellular network 205 to the WiFi network 210.

Figure 3:
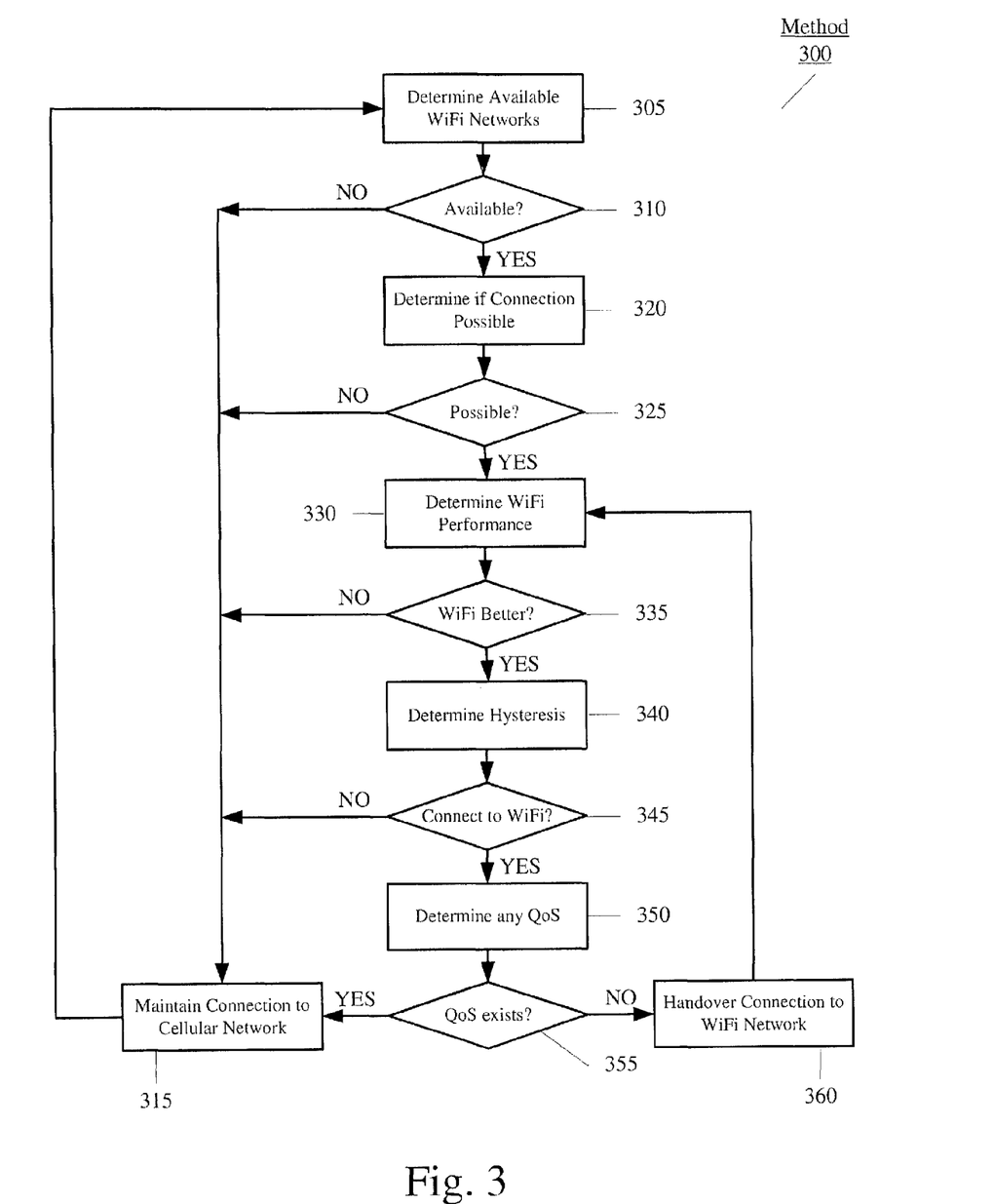
FIG. 3 shows an exemplary method for an optimized handover between a cellular network and a WiFi network.

FIG. 3 shows an exemplary method 300 for an optimized handover between a cellular network and a WiFi network. The method 300 illustrates a process in which the station 100 connects to a first network type such as the cellular network 205 and determines whether a handover is to be performed to a second network type such as the WiFi network 210. Specifically, the offloading manager 106 receives a plurality of network related data and station related data to determine whether the handover should be performed such that an optimal experience may be provided to the user of the station 100. Accordingly, even when a conventionally known WiFi network that normally provides a more optimal performance is available, the station 100 determines whether the handover is to occur since a given set of circumstances of a situation may indicate that the WiFi network provides a sub-optimal performance. For example, physical layer (PHY) metrics may indicate when a handover is to occur which indicate a current set of circumstances that the station 100 is experiencing. The method 300 will be described with regard to the station 100 of FIG. 1 and the system 200 of FIG. 2.

The method 300 may assume that the station 100 is currently associated with the cellular network 205. Depending upon a variety of factors such as service contract details, the station 100 may establish a connection to the cellular network 205 whenever the station 100 is within the operating area of the cellular network 205. Therefore, it may also be assumed that the station 100 is within the operating area of the cellular network 205 for the method 300. The station 100 may join the cellular network 205 using any known association process such as utilizing the identity of the station 100 that indicates credentials or other subscription type data that indicates a user of the station is a customer of the cellular network 205.

In step 305, the offloading manager 106 determines whether WiFi networks are available. The offloading manager 106 may include a set of instructions such that an initial step includes generating a probe request that is transmitted via the transceiver 115 using known frequencies or channels via the antenna 120 for WiFi networks (e.g., 1800-2100 MHz). Thus, as illustrated in FIG. 2, the station 100 is within the operating area of the WiFi network 210. A network component such as a server for the WiFi network 210 may generated a probe response to the probe request that is received by the station 100 and the offloading manager 106. Accordingly, the offloading manager 106 may determine that the WiFi network 210 is available for connection. However, for the station 150 in its current disposition within the system 200, the offloading manager 106 will not receive the probe response as it is located outside the operating area of the WiFi network 210.

It should be noted that the memory 110 may store network related data that indicates whether the station 100 is within an operating area of a known WiFi network. For example, the processor 105 may execute a location application that determines the location of the station 100. When the station 100 has previously joined a WiFi network, the offloading manager 106 may utilize the location of the station 100 to determine whether a known WiFi network is associated therewith. Accordingly, the offloading manager 106 may specify the probe request within a known channel corresponding to the known WiFi network. The offloading manager 106 may still transmit a respective probe request at all channels for WiFi networks or with a wildcard service set identifier (SSID) on all known channels to detect any available WiFi networks.

In step 310, a determination is made whether the WiFi network 210 is available. It should be noted that for illustrative purposes, only the WiFi network 210 is considered for the method 300. However, as will be described in further detail below, the method 300 may consider all available WiFi networks that are determined in step 305. If no WiFi network is determined to be available, the method 300 continues to step 315. In step 315, the offloading manager 106 determines that the connection to the cellular network 205 is to be maintained.

If step 310 determines that the WiFi network 210 is available, the method 300 continues to step 320. In step 320, the offloading manager 106 determines if a connection is possible. Whether the station 100 may join the WiFi network 210 includes a variety of different considerations. For example, despite receiving the probe response from the network component of the WiFi network 210, the network component may further include a data packet that indicates that no further connections may be made to the WiFi network 210 due to volume. Accordingly, the offloading manager 106 may receive an indication that the connection is not possible to the WiFi network 210. In another example, despite receiving the probe response, the station 100 may transmit a subsequent request as to whether a connection to the WiFi network 210 is possible. Due to various reasons that those skilled in the art will understand, the network component may not provide a response to this subsequent request (e.g., within a predetermined amount of time). The offloading manager 106 may retry the request (e.g., a predetermined number of times). If no response is received, the offloading manager 106 may determine that the connection to the WiFi network 210 is not possible.

It should be noted that the memory 110 may store further network related data that indicates whether the station 100 is capable of connecting to the WiFi network 210. For example, if the WiFi network 210 is known (e.g., known SSID) and the memory 110 stores corresponding authentication data (e.g., a password), the station 100 may be allowed to join the WiFi network 210. However, if the WiFi network 210 is unknown and no corresponding authentication data is stored or provided, the station 100 may be incapable of joining the WiFi network 210. In another example, the station 100 may have hardware or software components that prevent the station 100 from joining the WiFi network 210. If the station 100 includes hardware/software that is of a previous generation or is in a different configuration, the station 100 may be incapable of joining the WiFi network 210 using the protocols used therein. The network component of the WiFi network 210 may transmit a data packet to the station 100 that indicates the hardware/software requirements in order for the connection to be established.

In step 325, a determination is made whether the station 100 is capable of establishing a connection to the WiFi network 210. If the station 100 is incapable of connecting to the WiFi network 210, the method 300 continues to step 315 where the offloading manager 106 determines that the connection to the cellular network 205 is to be maintained.

If step 325 determines that the station 100 is capable of joining the WiFi network 210, the method 300 continues to step 330. In step 330, the offloading manager 106 determines a performance of the WiFi network 210. Specifically, the offloading manager 106 determines whether the WiFi network 210 provides a more optimal experience for the user than the current connection to the cellular network 205. As discussed above, the offloading manager 106 may utilize a set of criteria to determine whether the handover is to be performed such that the data offloading from the cellular network 205 to the WiFi network 210 is to occur.

In a first criterion for performance, the offloading manager 106 may consider physical layer metrics. That is, the offloading manager 106 considers the networking hardware transmission technologies of the WiFi network 210 based upon, for example, the seven layer Open Systems Interconnection (OSI) model of computer networking. Accordingly, the first criterion may relate to a signal level determination including a measurement of a received signal strength indicator (RSSI), a reference signal received power (RSRP), a reference signal received quotient (RSRQ), a signal to interference plus noise ratio (SINR), etc. These may be determined, for example, from the probe response received from the network component of the WiFi network 210. They may also be determined utilizing further messages or probe requests.

In a second criterion for performance, the offloading manager 106 may consider media access control (MAC) metrics. That is, the offloading manager 106 considers the data communication protocol of the WiFi network 210 based upon, again for example, the seven layer OSI model of computer networking. Accordingly, the second criterion may relate to throughput including a channel quality indicator (CQI), a number of resource blocks allocated in a downlink (DL), a DL block error ratio (BLER) (estimated from a DL cyclic redundancy check CRC), an estimated measure of a scheduling rate, a measure of latency, a measure of jitter, etc. These may also be determined, for example, from the probe response received from the network component of the WiFi network 210, further messages, further probe requests, etc.

In step 335, a determination is made whether the WiFi network 210 is more optimal than the cellular network 205 based upon the performance criteria described above. For example, each part of the criteria may have an associated predetermined threshold value. If select ones of the criteria (e.g., RSSI, RSRP, RSRQ, etc.) are above the threshold value, the offloading manager 106 may determine that the WiFi network 210 is more optimal. If select ones of the criteria (e.g., latency, jitter, etc.) are below the respective threshold value, the offloading manager 106 may again determine that the WiFi network 210 is more optimal. In another example, the offloading manager 106 may determine corresponding measurements for the cellular network 205. Those skilled in the art will understand that substantially similar manners may be used to determine the same measurements in the cellular network 205. Thus, the offloading manager 106 may compare the corresponding values of the criteria to determine whether which wireless network provides the more optimal user experience (e.g., a majority of the criteria is better for one wireless network over the other).

If the offloading manager 106 determines that the cellular network is more optimal, the method 300 continues to step 315 where the offloading manager 106 determines that the connection to the cellular network 205 is to be maintained.

If step 335 determines that the WiFi network 210 is more optimal than the cellular network, the method 300 continues to step 340. In step 340, the offloading manager 106 determines hysteresis data for the station 100. Specifically, the offloading manager 106 references handover data stored in the memory 110 regarding parameters related to prior handovers. Accordingly, the offloading manager 106 is able to utilize network data as well as station data in determining whether the handover is to be performed.

The hysteresis data may be a moving window average that is a measure for determining a relative timing of how the device is to perform the handover to the WiFi network 210. The average may be based upon a past history of a manner in which transfers or handovers to the WiFi network 210 happened in terms of a user profile such as how long the user stays in a particular radio access technology (RAT) (e.g., cellular, WiFi, etc.) and applications being executed by the processor 105 using the respective RAT. The average may also be used as a performance metric to determine whether the device is in a transitioning state in the WiFi network 210. Accordingly, the hysteresis data may indicate whether the handover is to be performed in view of the past history of the user of the station 100. Again, the hysteresis data may be stored in the memory 110 in which the relevant data regarding the above identified aspects are generated at the time (or at a later time) it occurred.

In step 345, a determination is made whether the offloading manager 106 is to perform the handover based upon the hysteresis data. If the determination indicates from the hysteresis data that the handover to the WiFi network 210 is not to be performed, the method 300 continues to step 315 where the offloading manager 106 determines that the connection to the cellular network 205 is to be maintained. However, if a determination is made that the handover to the WiFi network 210 is to be performed, the method 300 continues to step 350.

In step 350, the offloading manager 106 determines whether any QoS considerations exist. Specifically, the QoS considerations may relate to applications that are being executed by the processor 105 at the time the handover is to occur. Those skilled in the art will understand that select applications have a related QoS to ensure that the performance of the application is not affected from performing the handover. For example, a voice application (e.g., VoIP, VoLTE, etc.) requires no breaks in the connection to the other electronic device. Accordingly, the offloading manager 106 determines the applications that are being executed such that any corresponding QoS consideration is to be included in the determination of whether the handover is to be performed.

In step 355, a determination is made whether any QoS consideration exists for the handover to be performed. Thus, for example, if the processor 105 is currently executing a voice application, the offloading manager 106 determines that a QoS consideration exists such that the offloading manager 106 further determines that there should be no break in the service (i.e., no handover should be performed). Accordingly, the method 300 continues to step 315 where the offloading manager 106 determines that the connection to the cellular network 205 is to be maintained. However, the offloading manager 106 may determine that there is no QoS consideration. For example, the processor 105 may be in an idle state with regard to other applications such that no further applications are currently being executed. Thus, the method 300 continues to step 360. In step 360, as all criteria have been satisfied for the handover to be performed, the station 100 disconnects from the cellular network 205 such that a connection to the WiFi network 210 is established. As discussed above, the station 100 may associate with the WiFi network 210 using any known manner of association. For example, a password may be forwarded to the network component of the WiFi network 210 indicating authentication for the association.

After step 360, the method 300 returns to step 330 in which the performance of the WiFi network 210 is again determined. In this manner, the method 300 allows for a dynamic process in which the station 100 may join the most optimal wireless network given a set of conditions that the station 100 and the wireless networks are experiencing. For example, during the course of the connection with the WiFi network 210, further stations may join the WiFi network 210 and utilize a majority portion of the available bandwidth such that the performance of the WiFi network 210 relative to the station 100 becomes sub-optimal. The offloading manager 106 may perform steps 330-335 to determine whether the WiFi network 210 is still optimal to the cellular network 205. It should be noted that the offloading manager 106 may determine the performance metrics for the cellular network 205 as well to serve as a basis for the determination. If the offloading manager 106 concludes that the cellular network 205 has become more optimal to the WiFi network 210 that the station 100 is currently connected, the method 300 allows for the offloading manager 106 to handover the connection from the WiFi network 210 to the cellular network 205 to provide the most optimal experience to the user. Accordingly, as the station 100 is handed over, several effects take place such as data being offloaded from the WiFi network 210 and the station 100 being provided a more optimal connection for data exchange.

It should be noted that the exemplary method 300 described above may include further steps. In a first example, as described above, there may be multiple WiFi networks that the station 100 may join. When multiple WiFi networks exist having overlapping operating areas in which the station 100 is located, the station 100 may select the most optimal WiFi network to perform the handover from the cellular network 205. Accordingly, step 305 of the method 300 may include a further step of generating a list of the available WiFi networks beyond the WiFi network 210. The subsequent steps may then be performed for each of the WiFi networks that are determined to be available. The offloading manager 106 may then determine the most optimal WiFi network among the available ones for the handover to be performed.

In a second example, the offloading manager 106 may provide a prompt for various reasons. The offloading manager 106 may enable an automatic process for the method 300 such that the user is not required to provide any input as to whether the handover is to occur. However, the offloading manager 106 may also be configured to allow the user to provide manual inputs during the performance of a handover. For example, after step 355, the offloading manager 106 may indicate that the connection to the WiFi network 210 is more optimal than the current connection to the cellular network 205. The offloading manager 106 may provide a prompt whether the user wishes to perform the handover. In another example, the offloading manager 106 may provide a prompt for authentication data such as a password when a connection to the WiFi network 210 is established. In yet another example, the offloading manager 106 may have access to a subscription policy for the user of the station 100 such as credentials or other subscription type data. The offloading manager 106 may then determine whether the handover should be performed based upon this further criterion. If the subscription policy includes a data usage limit and the user has already exhausted or nearly exhausted this allotment, the offloading manager 106 may prompt the user indicating this aspect. The user may then manually indicate whether a connection to the cellular network 205 should still be used in view of this condition. In a specific example, if the station 100 is currently streaming a large data file (e.g., a movie), the offloading manager 106 may prompt the user that a handover should be performed to the WiFi network 210 as it may be more ideal, the data usage indicated by the subscription policy is exhausted, etc. Even if the WiFi network 210 has been determined to provide a sub-optimal experience, the offloading manager 106 may still prompt the user for a handover to the WiFi network 210 such that the user does not exceed the data usage limit.

In a third example, the method 300 may include generating a timer, particularly after determining the applications being executed. For example, the processor 105 may be executing a data transfer application. During the data transfer application, a time sensitive application such as a voice application may be executed. The data transfer application may be suspended for the length of the timer. Once the timer has lapsed, the offloading manager 106 may determine whether the time sensitive application has concluded. If still ongoing, the time sensitive application may be continued for another length of the timer when a subsequent check is performed. Once the check is performed and the time sensitive application has concluded, the offloading manager 106 may determine the available WiFi networks prior to continuing the data transfer application. Accordingly, the offloading manager 106 may suspend the data transfer application until the determination of whether a handover is to be performed is made. If the handover from the cellular network to the WiFi network is performed, the data transfer application may continue. If a connection to the cellular network is maintained, the data transfer application may still continue.

The exemplary embodiments provide a device and method for an optimized handover to a wireless network that provides a most optimal experience for a user of a station given a current set of conditions. The station may include a processor executing an offloading manager that determines the most optimal wireless network. Specifically, when connected to a cellular network, the offloading manager may determine whether a connection to a WiFi network is more optimal. When connected to a WiFi network, the offloading manager may determine whether a connection to the cellular network is more optimal. The offloading manager may utilize a variety of factors to determine whether the handover is to be performed. The factors may include the availability of the other network, the possibility of a connection to the other network, a performance comparison between the currently connected network and the other network, a hysteresis determination for the station, and QoS considerations, particularly for applications being executed by the processor at the time of the handover. The handover to the other network allows for the station to have the most optimal connection under the set of conditions as well as offload data of the network that the station was previously connected prior to the handover. It should be noted that the handover process does not require to be seamless. For example, there may be no requirement for an Internet Protocol (IP) to be retained.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, etc. In a further example, the offloading manager 106 may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
   establishing, by a station, a connection to a cellular network;
   determining, by a processor of the station, whether a WiFi network is available for connection;
   determining, by the processor, performance data of the WiFi network based upon network metrics;
   generating hysteresis data indicative of at least one prior handover to the WiFi network by the station, wherein the hysteresis data is a moving window average, the average being based upon a past history of a manner in which transfers or handovers to the WiFi network happened in terms of a user profile;
   determining, by the processor, a quality of service (QoS) parameter associated with a currently executed application, the QoS parameter being indicative of whether a handover from the cellular network to the WiFi network is permitted; and
   performing, by the station, a handover from the cellular network to the WiFi network when the performance data of the WiFi network satisfies a set of predetermined criteria for the network metrics and the QoS parameter and hysteresis data indicate the handover is permitted.

2. The method of claim 1, wherein the network metrics include a signal level determination and a throughput.

3. The method of claim 2, wherein the signal level determination includes at least one of a received signal strength indicator (RSSI), a reference signal received power (RSRP), a reference signal received quotient (RSRQ), and a signal to interference plus noise ratio (SINR).

4. The method of claim 2, wherein the throughput includes at least one of a channel quality indicator (CQI), a number of resource blocks allocated in a downlink (DL), a DL block error ratio (BLER), an estimated measure of a scheduling rate, a measure of latency, and a measure of jitter.

5. The method of claim 1, further comprising:
   determining performance data of the cellular network based upon the network metrics,
   wherein a set of predetermined criteria for the network metrics is a comparison between the performance data of the WiFi network with the performance data of the cellular network.

6. The method of claim 1, further comprising:
   determining performance data of the cellular network based upon the network metrics after establishing the connection to the WiFi network; and
   performing a further handover from the WiFi network to the cellular network when the performance data of the cellular network satisfies the set of predetermined criteria for the network metrics.

7. The method of claim 1, wherein:
   the determining of the WiFi network being available includes a plurality of WiFi networks;
   the determining of the performance data of the WiFi network includes determining performance data for each of the WiFi networks, such that the method further comprises:
   determining one of the WiFi networks to be a most optimal WiFi network for the handover to be performed.

8. The method of claim 1, wherein the connection to the cellular network is maintained when one of the performance data of the WiFi network fails the set of predetermined criteria for the network metrics and the QoS parameter indicates the handover is prevented.

9. The method of claim 1, further comprising:
   receiving subscription policy data for the station indicating a maximum allotted data usage on the cellular network; and
   performing the handover from the cellular network to the WiFi network when the subscription policy data indicates a substantial exhaustion of the maximum allotted data usage.

10. A device, comprising:
    a transceiver configured to communicate wireless data with a first network of a first network type and a second network of a second network type;
    a memory arrangement storing hysteresis data indicative of at least one prior handover to the second network; and
    a processor;
    wherein the processor and transceiver are configured to perform a handover from the first network to the second network that provides a more optimal experience by:
    establishing a connection to the first network;
    determining whether the second network is available for connection;
    determining performance data of the second network based upon network metrics;
    determining a quality of service (QoS) parameter associated with a currently executed application, the QoS parameter being indicative of whether the handover from the first network to the second network is permitted; and
    performing the handover from the first network to the second network when the performance data of the second network satisfies a set of predetermined criteria for the network metrics and the QoS parameter and hysteresis data indicate the handover is permitted.

11. The device of claim 10, wherein the first network type is one of a cellular network and a WiFi network and the second network type is the other of the cellular network and the WiFi network.

12. The device of claim 10, wherein the network metrics include a signal level determination and a throughput.

13. The device of claim 12, wherein the signal level determination includes at least one of a received signal strength indicator (RSSI), a reference signal received power (RSRP), a reference signal received quotient (RSRQ), and a signal to interference plus noise ratio (SINR).

14. The device of claim 12, wherein the throughput includes at least one of a channel quality indicator (CQI), a number of resource blocks allocated in a downlink (DL), a DL block error ratio (BLER), an estimated measure of a scheduling rate, a measure of latency, and a measure of jitter.

15. The device of claim 10, wherein the processor and transceiver are configured to perform the handover by:
   determining performance data of the first network based upon the network metrics,
   wherein a set of predetermined criteria for the network metrics is a comparison between the performance data of the first network with the performance data of the second network.

16. The device of claim 10, wherein the processor and transceiver are configured to perform a further handover by:
   determining performance data of the first network based upon the network metrics after establishing the connection to the second network; and
   performing the further handover from the second network to the first network when the performance data of the first network satisfies the set of predetermined criteria for the network metrics.

17. The device of claim 10, wherein the connection to the first network is maintained when one of the performance data of the second network fails the set of predetermined criteria for the network metrics and the QoS parameter indicates the handover is prevented.

18. A non-transitory computer readable storage medium with an executable program stored thereon, wherein the program instructs a microprocessor to perform operations comprising:
   establishing a connection to a first network of a first network type;
   determining whether a second network of a second network type is available for connection;
   determining performance data of the second network based upon network metrics;
   generating hysteresis data indicative of at least one prior handover to the WiFi network by the station, wherein the hysteresis data is based upon a past history of a manner in which transfers or handovers to the WiFi network happened;
   determining a quality of service (QoS) parameter associated with a currently executed application, the QoS parameter being indicative of whether a handover from the first network to the second network is permitted; and
   performing the handover from the first network to the second network when the performance data of the second network satisfies a set of predetermined criteria for the network metrics and the QoS parameter and hysteresis data indicate the handover is permitted.

19. The method of claim 10,
   wherein the hysteresis data is a moving window average, the average being based upon a past history of a manner in which transfers or handovers to the WiFi network happened in terms of a user profile.

20. The method of claim 1, further comprising:
   determining, by the processor, a data usage indicated by a subscriber policy;
   wherein when the data usage indicated by the subscriber policy is exhausted, performing the handover from the cellular network to the WiFi network when the performance data of the WiFi network fails to satisfy the set of predetermined criteria.

* * * * *